(12) United States Patent
Yan

(10) Patent No.: US 11,156,747 B2
(45) Date of Patent: Oct. 26, 2021

(54) GLASS LENS AND LENS MODULE USING THE SAME

(71) Applicant: AAC Optics Solutions Pte. Ltd., Singapore (SG)

(72) Inventor: Junjie Yan, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 217 days.

(21) Appl. No.: 16/686,234

(22) Filed: Nov. 18, 2019

(65) Prior Publication Data

US 2020/0158921 A1  May 21, 2020

(30) Foreign Application Priority Data

Nov. 19, 2018 (CN) .......................... 201821906268.1

(51) Int. Cl.
*G02B 3/02* (2006.01)
*G02B 13/00* (2006.01)
*G02B 3/00* (2006.01)

(52) U.S. Cl.
CPC ............. *G02B 3/02* (2013.01); *G02B 13/002* (2013.01); *G02B 13/0025* (2013.01); *G02B 2003/0093* (2013.01)

(58) Field of Classification Search
CPC .... G02B 3/02; G02B 13/0025; G02B 13/002; G02B 9/02; G02B 2003/0093; G02B 19/0009; H04N 5/2254
USPC .................................. 359/708, 718, 796–797
See application file for complete search history.

(56) References Cited

U.S. PATENT DOCUMENTS

| | | | | |
|---|---|---|---|---|
| 2,254,961 A | * | 9/1941 | Harris | ..................... F21V 13/04 362/327 |
| 6,052,233 A | * | 4/2000 | Koike | ...................... G02B 9/02 359/642 |
| 6,392,819 B1 | * | 5/2002 | Harada | .................. G01B 11/26 356/153 |
| 6,856,465 B2 | * | 2/2005 | Ning | ...................... G02B 27/32 359/642 |
| 7,474,476 B2 | * | 1/2009 | Ueta | ....................... G02B 7/02 359/717 |
| 7,589,914 B2 | * | 9/2009 | Katsuma | .................. G02B 3/04 359/718 |

(Continued)

FOREIGN PATENT DOCUMENTS

WO    WO-2020103611 A1 * 5/2020 ........... G02B 13/002

*Primary Examiner* — Zachary W Wilkes
(74) *Attorney, Agent, or Firm* — W&G Law Group

(57) ABSTRACT

The present disclosure provides a glass lens and a lens module. The glass lens has an optical axis, and includes an optical portion and a connecting portion surrounding the optical portion. The connecting portion includes a first reference surface and a second reference surface opposite to the first reference surface. The optical portion includes a first optical surface located on one side of the first reference surface and a second optical surface located on one side of the second reference surface. The structure of the glass lens of the present disclosure can form a smaller optical portion without occupying space, and meanwhile, a matching structure can be disposed on the second reference surface of the connecting portion, which can effectively reduce the installation difficulty and positioning cost of the glass lens, and make the product have excellent optical performances meanwhile.

14 Claims, 1 Drawing Sheet

(56) References Cited

U.S. PATENT DOCUMENTS

| | | | | |
|---|---|---|---|---|
| 7,766,530 B2* | 8/2010 | Hwang | ............... | G02B 19/0061 |
| | | | | 362/613 |
| 8,355,216 B2* | 1/2013 | Orihara | ................ | H04N 5/2254 |
| | | | | 359/819 |
| 8,493,672 B2* | 7/2013 | Hirao | ................. | G02B 13/0025 |
| | | | | 359/796 |
| 8,649,111 B2* | 2/2014 | Yano | ................. | G02B 13/0085 |
| | | | | 359/707 |
| 8,736,738 B2* | 5/2014 | Lee | .................... | G02B 13/0025 |
| | | | | 348/335 |
| 8,817,396 B2* | 8/2014 | Mori | .................... | G02B 13/001 |
| | | | | 359/808 |
| 9,140,826 B2* | 9/2015 | Miyazaki | ............ | G02B 27/0018 |
| 9,490,378 B2* | 11/2016 | Heng | ................. | H01L 31/0203 |
| 9,829,698 B2* | 11/2017 | Haraguchi | ............ | H04N 5/2253 |
| 9,997,681 B2* | 6/2018 | Kim | .................... | G02B 19/0014 |
| 10,336,021 B2* | 7/2019 | Chang | ....................... | G02B 3/04 |
| 10,495,789 B2* | 12/2019 | Inoue | ........................ | G02B 23/2469 |
| 2009/0086342 A1* | 4/2009 | Seki | ........................ | G02B 7/028 |
| | | | | 359/820 |
| 2009/0213476 A1* | 8/2009 | Takumi | .................... | G02B 3/00 |
| | | | | 359/796 |
| 2018/0252386 A1* | 9/2018 | Kim | ........................ | F21V 5/04 |
| 2020/0209549 A1* | 7/2020 | Endo | ........................ | C03B 11/08 |
| 2020/0409111 A1* | 12/2020 | Ma | ........................ | H04N 5/2254 |
| 2021/0006695 A1* | 1/2021 | Miyasaka | .............. | G02B 7/022 |

* cited by examiner

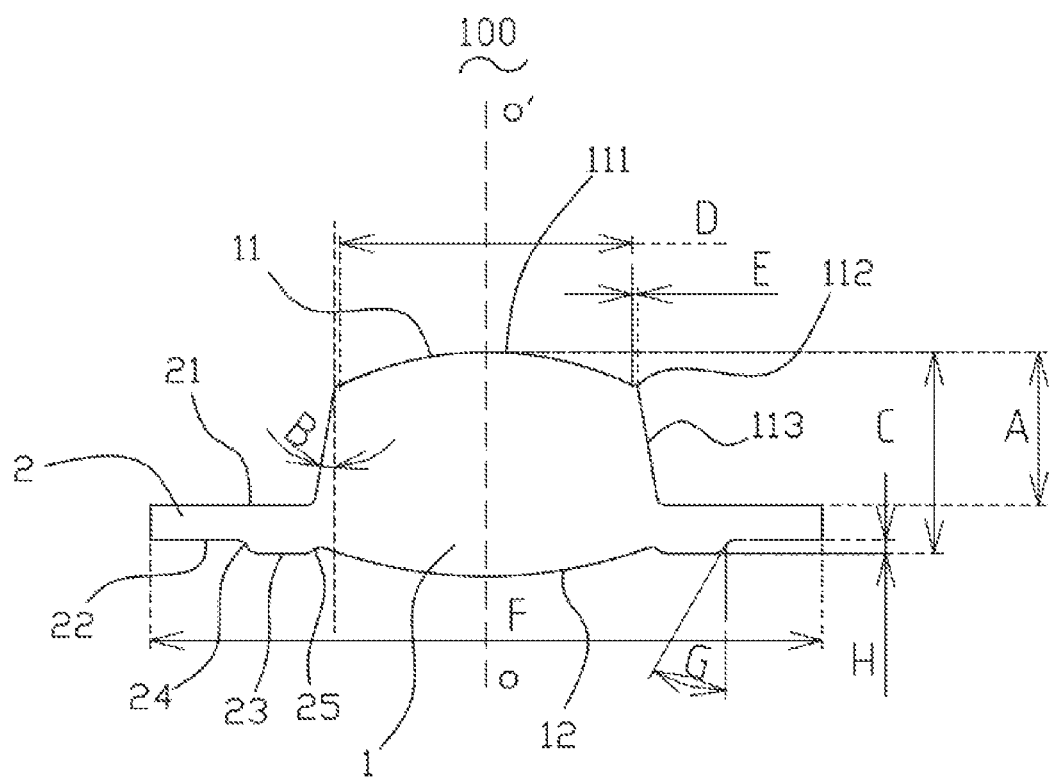

GLASS LENS AND LENS MODULE USING THE SAME

TECHNICAL FIELD

The present disclosure relates to the field of optical imaging technologies, and more particularly to a glass lens and a lens module using the same.

BACKGROUND

With the continuous development of science and technology, electronic devices are continuously developed towards intelligence. In addition to digital cameras, portable electronic devices such as tablet computers and mobile phones are also equipped with lens modules having photographing and image shooting functions, so as to meet the photographing needs of users at any time.

As a key part of the lens module, glass lenses in the existing technologies are generally circular, which include an optical portion located in a center and a connecting portion surrounding the optical portion, and are prepared by cold working or glass laminating. However, such structure cannot perform a complicated matching mechanism in the case of a small size, and it is also impossible to make a head size of an optical member with a small size in the case of a large size.

Therefore, it is necessary to provide a novel glass lens and a novel lens module to solve the above-mentioned problems.

BRIEF DESCRIPTION OF THE DRAWINGS

FIG. 1 is a structural schematic diagram of a glass lens according to the present disclosure.

DETAILED DESCRIPTION

The present disclosure is further explained hereinafter with reference to the drawings and embodiments.

As shown in FIG. 1, a glass lens 100 includes an optical portion 1 located in a center and a connecting portion 2 surrounding the optical portion 1. The glass lens has an optical axis that passes through a middle axis of the optical axis 1.

The connecting portion 2 includes a first reference surface 21 and a second reference surface 22 opposite to the first reference surface 21. In this embodiment, the first reference surface 21 and the second reference surface 22 are planar, and the first reference surface 21 and the second reference surface 22 are parallel to each other. In practice, in other alternative embodiments, the first reference surface 21 and the second reference surface 22 are only reference standards, and may be of other structures.

The optical portion 1 includes a first optical surface 11 located on one side of the first reference surface 21 and a second optical surface 12 located on one side of the second reference surface 22.

The first optical surface 11 includes an optically effective region and a transitional inclined surface 113 extending from the optically effective region towards the first reference surface 21 and a direction far away from the optical axis. Specifically, in this embodiment, the optical axis is located in a center of the optically effective region, where the optically effective region includes an intermediate curved surface 111 located in a middle and an epitaxial curved surface 112 extending from a periphery of the intermediate curved surface and connected with the transitional inclined surface 113. A curvature of the epitaxial curved surface 112 is greater than a curvature of the intermediate curved surface 111. Preferably, the intermediate curved surface 111 and the epitaxial curved surface 112 both protrude towards a direction far away from the second optical surface 12.

The transitional inclined surface 113 is connected with the first reference surface 21. During actual processing, the transitional inclined surface 113 is a draft angle formed by moulding, that is, an angle B between the transitional inclined surface 113 and the optical axis is a draft angle of the optical portion.

The first optical surface 11 is opposite to a protruding direction of the second optical surface 12. The first optical surface 11 is formed by protruding from the first reference surface 21 towards a direction far away from the second reference surface 22. The second optical surface 12 is formed by protruding from the second reference surface 22 towards a direction far away from the first reference surface 21.

In addition, the connecting portion 2 further includes a coordination bulge 23 protruding from one side of the second reference surface 22 close to the second optical surface 12 towards the direction far away from the first reference surface 21. One side of the coordination bulge 23 far way from the second optical surface 22 is a coordination inclined surface 24, and the coordination inclined surface 24 extends from the coordination bulge 23 toward a direction close to the first reference surface 21 and far away from the optical axis. An angle between the coordination inclined surface 24 and the optical axis is G, and a maximum distance between the coordination bulge and the second reference surface 22 is H. A connecting surface 25 is further disposed between the coordination bulge 23 and the second optical surface 12, and the arrangement of the coordination bulge 23 can facilitate assembly between the glass lenses during installation.

Specifically, the glass lens satisfies following conditions in size:

$A/C > 0.5$;
$0° < B < 45°$; and
$D/F < 1.5$;

where, A is a maximum distance between the first optical surface 11 and the first reference surface 21, B is an angle between the transitional inclined surface 113 and the optical axis, C is a maximum thickness of the glass lens in a direction parallel to the optical axis, F is a maximum diameter of the glass lens in a direction vertical to the optical axis, and D is a diameter of the optically effective region 1.

In another preferred embodiment, further preferably, a maximum distance between the intermediate curved surface 111 and the first reference surface 21 is $A_1$ (in this embodiment, a height of the intermediate curved surface 111 in comparison with the first reference surface 21 is higher than that of the epitaxial curved surface 112, so the maximum distance $A_1$ between the intermediate curved surface 111 and the first reference surface 21 is the maximum distance A between the first optical surface 11 and the first reference surface 21), and a width of the epitaxial curved surface 112 in a direction vertical to the optical axis is E. The glass lens of this embodiment also satisfies following conditions:

$A1 > 0.5$ mm;
$A1/C > 0.5$; and
$E < 0.2$ mm.

In a further preferred embodiment, an angle G between the coordination inclined surface 24 and the optical axis satisfies a condition of $0° < G < 45°$.

In another preferred embodiment, a maximum distance H between the coordination bulge 23 and the second reference surface 22 satisfies a condition of −1 mm<H<1 mm.

The glass lens of the present disclosure is a lens structure formed by hot pressing a glass plate with a hard metal mold. During actual processing, the glass lens needs to be processed by moulding in two sections. The optical portion is processed by pre-molding during the moulding in the first section, a contour of the optical portion is precisely processed during the moulding in the second section, and finally the glass lens is removed from the mold by cutting.

Compared with the existing technologies, the glass lens of the present disclosure has the optical axis, the glass lens includes the optical portion and the connecting portion surrounding the optical portion, the connecting portion includes the first reference surface and the second reference surface opposite to the first reference surface, the optical portion includes the first optical surface located on one side of the first reference surface and the second optical surface located on one side of the second reference surface, the first optical surface includes the optically effective region and the transitional inclined surface extending from the optically effective region towards the first reference surface, the transitional inclined plane extends towards the direction far away from the optical axis, the optically effective region surrounds the optical axis, the optical axis is located in the center of the optically effective region, and the glass lens satisfies conditions of A/C>0.5, 0°<B°<45°, and D/F<1.5. A structure of the glass lens according to the present disclosure can form a smaller optical portion without occupying space. Moreover, setting a matching structure on the second reference surface of the connecting portion can effectively reduce the installation difficulty and positioning cost of the glass lens, and make the product have excellent optical performances meanwhile.

The present disclosure further provides a lens module, which includes the glass lens mentioned above. When the glass lens is employed, the optical portion with a smaller size can be processed, which can facilitate the miniaturization of a head of the lens module, thus the glass lens is suitable for optical products with larger size requirements, and can ensure the optical performance and fixing reliability.

The foregoing descriptions are merely embodiments of the present disclosure, but are not intended to limit the patent scope of the present disclosure. All equivalent structures or equivalent flow transformations made using the description of the present disclosure and the accompanying drawings, or being used directly or indirectly in other related technical fields, are similarly included in the protection scope of the present disclosure.

What is claimed is:

1. A glass lens having an optical axis, comprising an optical portion and a connecting portion surrounding the optical portion;
   wherein the connecting portion comprises a first reference surface and a second reference surface opposite to the first reference surface,
   the optical portion comprises a first optical surface located on one side of the first reference surface and a second optical surface located on one side of the second reference surface,
   the first optical surface comprises an optically effective region and a transitional inclined surface extending from the optically effective region towards the first reference surface,
   the transitional inclined surface extends away from the optical axis,
   the optically effective region surrounds the optical axis, and the optical axis is located in a center of the optically effective region;
   wherein the glass lens satisfies following conditions:
   A/C>0.5;
   0°<B<45°; and
   D/F<1.5;
   where
   A is a maximum distance between the first optical surface and the first reference surface,
   B is an angle between the transitional inclined surface and the optical axis,
   C is a maximum thickness of the glass lens in a direction parallel to the optical axis,
   F is a maximum diameter of the glass lens in a direction vertical to the optical axis, and
   D is a diameter of the optically effective region.

2. The glass lens according to claim 1, wherein the optically effective region comprises an intermediate curved surface located in a middle and an epitaxial curved surface extending from a periphery of the intermediate curved surface and connected with the transitional inclined surface, a curvature of the epitaxial curved surface is greater than a curvature of the intermediate curved surface; and
   the glass lens satisfies following conditions:
   A1>0.5 mm;
   A1/C>0.5; and
   E<0.2 mm;
   where
   A1 is a maximum distance between the intermediate curved surface and the first reference surface, and
   E is a width of the epitaxial curved surface in the direction vertical to the optical axis.

3. The glass lens according to claim 2, wherein the intermediate curved surface and the epitaxial curved surface protrude towards a direction far away from the second optical surface.

4. The glass lens according to claim 1, wherein one side of the second reference surface close to the second optical surface is protruded with a coordination bulge towards a direction far away from the first reference surface,
   one side of the coordination bulge far away from the second optical surface is a coordination inclined surface, the coordination inclined surface extends from the coordination bulge towards a direction far away from the optical axis and close to the first reference surface; and
   an angle G between the coordination inclined surface and the optical axis satisfies following condition:
   0°<G<45°.

5. The glass lens according to claim 4, wherein a maximum distance H between the coordination bulge and the second reference surface satisfies following condition:
   −1 mm<H<1 mm.

6. The glass lens according to claim 1, wherein the second optical surface is a curved surface protruding towards a direction far away from the first optical surface.

7. The glass lens according to claim 1, wherein the glass lens is formed by hot pressing a glass plate with a hard metal mold.

8. A lens module, comprising a glass lens having an optical axis;
   wherein the glass lens comprising an optical portion and a connecting portion surrounding the optical portion;
   wherein the connecting portion comprises a first reference surface and a second reference surface opposite to the first reference surface, the optical portion comprises a first optical surface located on one side of the first reference surface and a second optical surface located on one side of the second reference surface, the first optical surface comprises an optically effective region and a transitional inclined surface extending from the optically effective region towards the first reference surface, the transitional inclined surface extends away from the optical axis, the optically effective region surrounds the optical axis, and the optical axis is located in a center of the optically effective region;

wherein the glass lens satisfies following conditions:

$A/C>0.5$;

$0°<B<45°$; and $D/F<1.5$;

where

A is a maximum distance between the first optical surface and the first reference surface, B is an angle between the transitional inclined surface and the optical axis, C is a maximum thickness of the glass lens in a direction parallel to the optical axis, F is a maximum diameter of the glass lens in a direction vertical to the optical axis, and D is a diameter of the optically effective region.

9. The lens module according to claim 8, wherein the optically effective region comprises an intermediate curved surface located in a middle and an epitaxial curved surface extending from a periphery of the intermediate curved surface and connected with the transitional inclined surface, a curvature of the epitaxial curved surface is greater than a curvature of the intermediate curved surface; and the glass lens satisfies following conditions:

$A1>0.5$ mm;

$A1/C>0.5$; and $E<0.2$ mm;

where

A1 is a maximum distance between the intermediate curved surface and the first reference surface, and E is a width of the epitaxial curved surface in the direction vertical to the optical axis.

10. The lens module according to claim 9, wherein the intermediate curved surface and the epitaxial curved surface protrude towards a direction far away from the second optical surface.

11. The lens module according to claim 8, wherein one side of the second reference surface close to the second optical surface is protruded with a coordination bulge towards a direction far away from the first reference surface, one side of the coordination bulge far away from the second optical surface is a coordination inclined surface, the coordination inclined surface extends from the coordination bulge towards a direction far away from the optical axis and close to the first reference surface; and an angle G between the coordination inclined surface and the optical axis satisfies following condition:

$0°<G<45°$.

12. The lens module according to claim 11, wherein a maximum distance H between the coordination bulge and the second reference surface satisfies following condition:

$-1$ mm$<H<1$ mm.

13. The lens module according to claim 8, wherein the second optical surface is a curved surface protruding towards a direction far away from the first optical surface.

14. The lens module according to claim 8, wherein the glass lens is formed by hot pressing a glass plate with a hard metal mold.

\* \* \* \* \*